Dec. 8, 1953   L. R. BANGSBERGH   2,661,656
FILM STRIP ADVANCING MECHANISM FOR PROJECTORS
Filed April 3, 1951
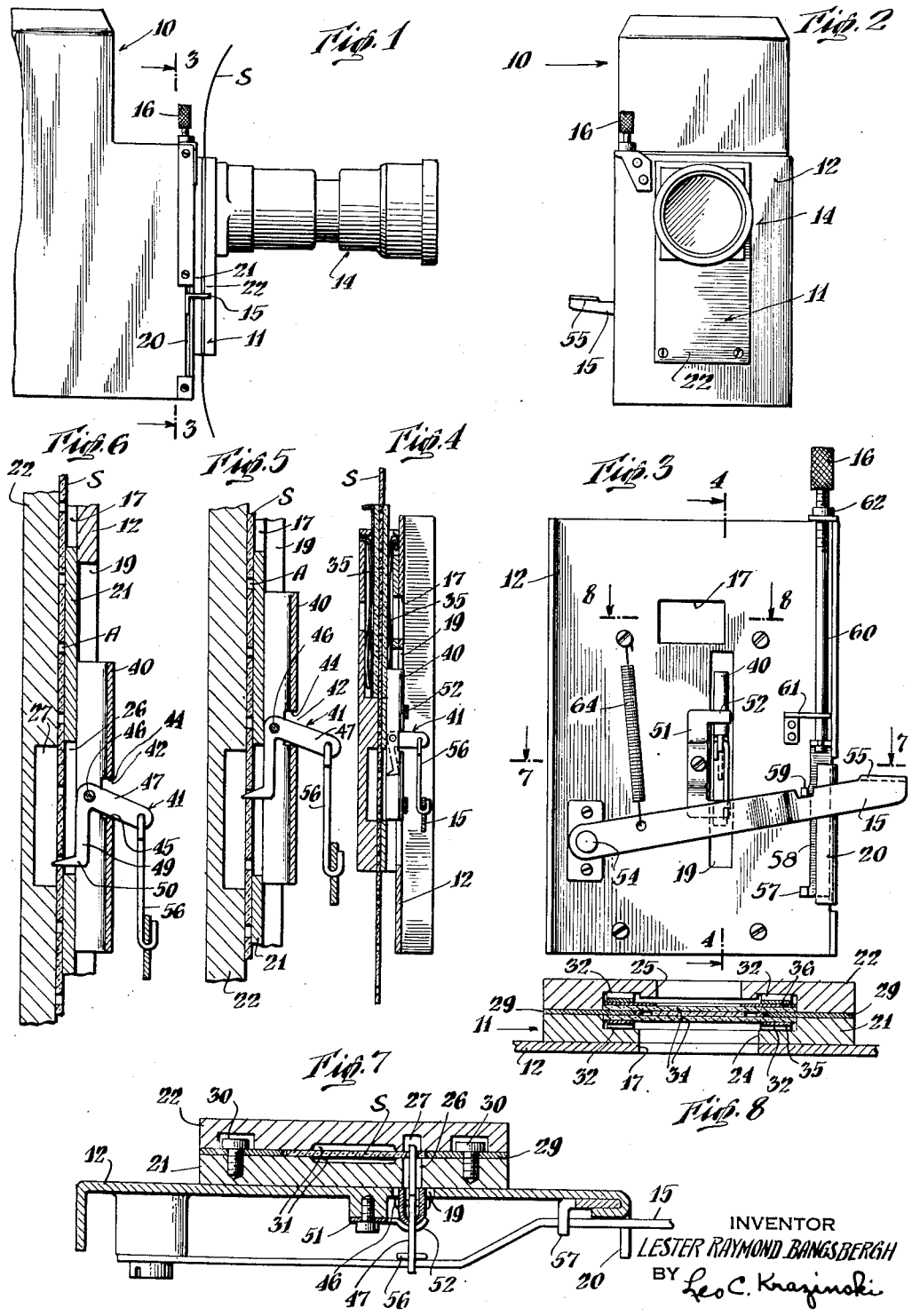
INVENTOR
LESTER RAYMOND BANGSBERGH
BY Leo C. Krajinski
ATTORNEY Patented Dec. 8, 1953

2,661,656

UNITED STATES PATENT OFFICE 2,661,656

FILM STRIP ADVANCING MECHANISM FOR PROJECTORS

Lester Raymond Bangsbergh, Dobbs Ferry, N. Y., assignor to Harvey T. Mann, New York, N. Y.

Application April 3, 1951, Serial No. 219,076

9 Claims. (Cl. 88—28)

1

The present invention relates to projectors, and, more particularly, relates to projectors of the type for projecting photographic image bearing strips of film provided with a plurality of frames each having an opening associated therewith for cooperation with mechanism for advancing the strips.

Accordingly, an object of the present invention is to provide such a projector having film strip advancing mechanism which is simple and economical in construction and is accurate and reliable in operation.

Another object is to provide such mechanism having an element cooperating with the film strip opening for advancing the film strip which element is self indexing regardless of the position of the openings when the film strip is initially inserted into the projector.

Another object is to provide such mechanism which will not damage the film strip.

Another object is to provide such a projector having an improved guideway for the film strip.

Another object is to provide such a guideway which maintains the film strip frames perfectly flat at the plane of projection but permits the film strip to be moved freely therethrough whereby the emulsion on the film is not damaged.

A further object is to provide such a guideway which is adapted to accommodate film strips of different lengthwise dimensions.

Other and further objects will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a projector comprising in combination a guideway for a strip of film which has an opening associated with each frame thereof, a member slidably mounted adjacent the guideway for movement longitudinally with respect thereto and having a pair of spaced stops, a lever pivotally mounted on the member having an arm positioned between the stops and having a second arm formed with an end portion for extending into the frame openings, and manually operable means for rocking the lever and effecting sliding movement of the member upon engagement of one of the stops of the first mentioned arm.

In a preferred embodiment of the invention about to be described, the slidable member is maintained adjacent the guideway by resilient

2 means which are adapted to yield while the lever portion is seeking a frame opening during initial operation in cases where the film strip when inserted was not indexed with the advancing mechanism, whereby the film strip will not be nicked or torn.

The guideway includes a spacing means of a thickness slightly greater than the film strip to form a passageway through which the film strip is advanced, and includes spring urged transparent plates at the point of projection for maintaining the film strip smooth and flat, which plates are spaced apart by the aforementioned spacing means. Interchangeable frames are associated with the plates for accommodating film strip frames of different lengthwise dimensions.

A preferred embodiment of the invention has been chosen for purposes of illustration and description and is shown in the accompanying drawing, forming a part of the specification, wherein:

Fig. 1 is a fragmentary side elevational view of a projector embodying the invention.

Fig. 2 is a front view of the projector shown in Fig. 1.

Fig. 3 is an enlarged sectional view taken substantially along the line 3—3 on Fig. 1 illustrating the film strip advancing mechanism in elevation.

Fig. 4 is a sectional view taken along the line 4—4 on Fig. 3 with the film strip advancing element shown in its at rest or normal position.

Fig. 5 is a fragmentary enlarged sectional view with the film strip advancing element shown in the position it assumes upon initial actuation.

Fig. 6 is a view similar to Fig. 5 with the film strip advancing element shown in the position it is moved at the completion of the film advancing stroke.

Fig. 7 is a fragmentary enlarged sectional view taken along the line 7—7 on Fig. 3.

Fig. 8 is a fragmentary enlarged sectional view taken along the line 8—8 on Fig. 3 illustrating details of the film strip guideway.

Referring to the drawing and more particularly to Figs. 1 and 2 thereof, there is shown a projector of the character previously indicated herein which comprises a light source housing 10 of conventional design, a guideway assembly 11 for a film strip S mounted on the front wall 12 of the housing, a lens assembly 14 mounted on the front of the guideway assembly, and film strip advancing mechanism of which only an operating handle 15 and handle adjusting knob 16 are shown in these views.

As illustrated in Figs. 3 to 8, the wall 12 has a rectangular opening 17 at the point of projection through which a beam of light is adapted to pass and has a vertical slot 19 just below the opening 17 for receiving an element of the film strip advancing mechanism, to be described hereinafter. A vertical slot 20 is provided in the side wall of the housing adjacent the rear of the wall 12 through which the handle 15 extends.

The guideway assembly 11 comprises a pair of superimposed body members 21 and 22, the member 21 being secured to the front wall 12 of the housing and the member 22 being removably attached to the member 21 (Figs. 1 and 4 to 8). These members are formed with an opening 24 and 25, respectively, in alignment with the light beam opening 17 and each other, the opening 25 being somewhat smaller (Fig. 8). As best shown in Figs. 5 to 7, the member 21 has a vertical slot 26 adjacent the slot 19 for the reception of a film advancing element, and the member 22 has a recess 27 facing the slot 26.

A passageway for the film strip is provided between the members 21 and 22 by means of a pair of parallel, spaced apart relatively thin strips 29 secured to the member 21 by means of screws 30 or the like (Figs. 7 and 8). These strips have a thickness slightly greater than the thickness of the film strip, whereby the members 21 and 22 are spaced apart to permit the film strip to be moved freely therethrough but without any tendency to fold or buckle because of excessive clearance. The inner side edges of the strips 29 are engaged by the side edges of the film strip S to maintain the latter in vertical alignment. As shown in Fig. 7, the members 21 and 22 are each provided with a vertical recess 31 extending from end to end and facing the front and back of the film strip at the image frames thereof to prevent the film strip from rubbing against the guideway and damaging the emulsion.

In order to maintain the film strip perfectly flat at the point of projection and thereby minimize distortion of the projected image, the members 21 and 22 have a recess 32 at each side of their respective openings 24 and 25 (Fig. 8) in which the side edges of a pair of transparent plates 34 are positioned. Suitable flat springs 35 are mounted in the recesses 32 for urging the plates together, but the inner edges of the strips 29 maintain the plates apart to permit free movement of the film strip therebetween. A frame or mask 36 having an opening corresponding to the area of the image frames to be projected is mounted between the upper plate 34 (as viewed in Fig. 8) and its springs.

If desired, the frame 36 may be interchanged with other frames having openings corresponding to image frames of different areas. This is facilitated by reason of the detachable connection between the members 21 and 22. Likewise, the strips 29 may be interchanged with such strips of different thickness to accommodate film strips of different thickness.

Referring now to Figs. 3 to 7, there is shown mechanism for advancing the film strip through the guideway just described, preferably, one frame at a time. This mechanism is mounted on the back of the front wall 12 (Figs. 3, 4, and 7), and generally comprises a member 40 slidably mounted in the slot 19 and riding on the back of the body member 21 and a lever 41 pivotally mounted on the member 40 acting as a film strip engaging and advancing element which is rocked by the handle 15.

The slidable member 40 may be channel-shaped with its open side facing the body member 21 and its flanges riding thereon. A slot or opening 42 is formed in the wall opposite its open side having upper and lower side edges 44 and 45, respectively, as viewed in Figs. 4 to 6, which serve as stops for the lever 41, as described hereinafter.

The lever 41 may be a bell crank which is pivotally mounted on a crosswise extending pin 46 carried by the channel member 40 (Fig. 7), and which comprises an arm 47 extending through the opening 42 for cooperation with the stops 44 and 45 and a second arm 49 having a pointed portion 50 at its free end adapted to be moved into slot 26 and recess 27 of the members 21 and 22 and enter the apertures or openings A of the film strip (Figs. 5 to 7).

The slidable member 40 is urged against the back of the body member 21 by resilient means, such as a flat spring 51 secured to the back of the wall 12 (Figs. 3 and 7), which spring has a pair of spaced fingers 52 straddling the opening 42 and engaging the wall in which this opening is formed. As shown in Fig. 7, the fingers 52 conform to the arcuate contour of this wall and thereby serve as bearing means for maintaining the slidable member in vertical alignment.

The handle 15 has one end pivotally mounted on the back of the wall 12 at 54 and has a transverse tab portion 55 at its other end to facilitate manual engagement thereof to depress the handle. The handle is operatively connected to the lever 41 by a link 56 having its ends pivotally mounted on the handle and the lever arm 47, respectively. The stroke of the handle is determined by a pair of stops 57 and 59 whereby the film strip will be advanced one frame at a time, as about to be described. As shown in Figs. 3 and 7, the stop 57 limits the downward movement of the handle and the stop 59 limits the upward movement of the handle. Both stops are shown formed on a slidable, elongate element 58 preferably for varying the range of the handle and the movement of the film strip advancing elements.

Adjustment of the slidable element 58 may be accomplished by loosely coupling the same to the lower end of a rod 60 extending through a lower bearing 61 and screw threaded through an upper bearing 62 (Fig. 3). The upper end of this rod has the knob 16 secured thereto for turning the rod and causing the screw threaded bearing to effect raising and lowering of the element 58 and the stops 57 and 59 thereon.

The handle 15 is preferably maintained in its normally upper or at rest position by a spring 64 having its upper end connected to the back of the wall 12 and having its lower end connected to the handle.

In operation, the film strip is inserted at the upper end of the guideway with its lower end extending just below the slot 26 and recess 27. The element 58 is then positioned to adjust the stroke or range of the film strip advancing mechanism to move the film strip downwardly one frame at a time, as well as to center each frame with respect to the opening 17.

The elements of the strip advancing mechanism normally are in the position shown in Figs. 3 and 4, with the handle 15 up, the lever arm 47 bearing against the upper stop 44 and holding the slidable member 40 in its uppermost position, and the lever portion 50 out of film engaging position. Upon initial downward movement of the handle, the lever 41 is rocked to the position shown in Fig. 5 with the lever arm 47 now engaging the stop 45 and the lever portion 50 extending into an aperture A of the film strip. Further downward movement of the handle causes the lever, by reason of its connection to the slidable member by means of the pin 46 and engagement of the stop 45 by the lever arm 47, to move downwardly together with the slidable member, whereby the lever portion 50 advances the film strip downwardly. The position of the elements at the end of such movement is illustrated in Fig. 6. When the handle is released, the spring 64 returns the same to its normal position. During such movement, the handle first rocks the lever upwardly to cause the portion 50 to be retracted and disengage the film strip and to cause its arm 47 to engage the stop 44, whereupon further upward movement of the handle causes the lever and the slidable member to be carried upwardly to the position shown in Fig. 4 with the lever portion 50 in position to engage the next aperture upon another operation of the handle.

In the event upon initial operation of the handle, an aperture of the film strip is not aligned with the portion 50, the portion 50 rides along the film strip until it locates an aperture and then advances the film strip to a position whereby the next aperture will be in alignment with the portion 50 when returned to its upper position. In this manner, the advancing mechanism is self indexing.

During such an indexing operation, it will be observed that the portion 50 would normally bear against the film strip to bend the portion thereof between the slot 26 and recess 27 out of its vertical path. Should the film strip for some reason resist such bending movement, the pointed end portion would bear against the film strip with considerable pressure and could dig into the film strip and tear or otherwise damage the same. This, however, is prevented by the spring 51 which is adapted to yield and permit slight movement of the slidable member 40 and the lever carried thereon towards the right (as viewed in Figs. 5 and 6), whereby the pointed end portion 50 slides along the film strip without inflicting damage thereto. Also, if for some unknown reason the film strip offers excessive resistance to movement, the spring 51 yields before the film strip is damaged.

From the foregoing description, it will be seen that the present invention provides a simple and practical film strip guideway and advancing mechanism for projectors which embodies adjustable or interchangeable elements enabling film strips of different sizes to be used in connection therewith. The apparatus is constructed of a minimum number of parts which can be economically manufactured and assembled. The advancing mechanism is reliable in operation, will not damage the film strip, is self indexing and can readily withstand such rough usage to which it may normally be subjected.

As various changes may be made in the form, construction and arrangement of the parts herein, without departing from the spirit and scope of the invention and without sacrificing any of its advantages, it is to be noted that all matters are to be interpreted as illustrative and not in any limiting sense.

What is claimed is:

1. In a projector of the class described, the combination of a guideway for a strip of film which has an opening associated with each frame thereof, a member slidably mounted adjacent said guideway for movement longitudinally with respect thereto and having a pair of spaced, rigid stops, a lever pivotally mounted on said member having an arm positioned between said stops and having a second arm formed with an end portion for extending into the frame openings, and manually operable means connected to said lever for sequentially rocking said lever between said stops and then effecting movement of said slidable member upon engagement of one of said stops of said first mentioned arm.

2. A projector according to claim 1, wherein said slidable member is a channel-shaped element formed with an opening through which said first mentioned arm extends having opposite edges providing said stops.

3. A projector according to claim 1, wherein said lever is a bell crank having a pointed end portion at the free end of said second arm.

4. A projector according to claim 1, wherein resilient means engage said slidable member to maintain said member adjacent said guideway.

5. A projector according to claim 1, wherein said manually operable means include a pivotally mounted handle and linkage means connecting said first mentioned arm and said handle.

6. In a projector of the class described, the combination of a guideway for a strip of film which has an aperture associated with each frame thereof, a channel-shaped member extending longitudinally with respect to said guideway with its open side facing said guideway and having an opening in the wall opposite its open side defining a pair of spaced stops, means for mounting said member for movement longitudinally with respect to said guideway, a bell crank pivotally mounted on said member for movement about an axis perpendicular to the longitudinal axis of said member, said bell crank having an arm extending through said opening for alternately engaging said stops and having a second arm formed with an end portion for extending into said frame apertures, a pivotally mounted manually operable handle, linkage means interconnecting said first mentioned arm and said handle, a pair of stops for limiting the extent of movement of said handle, and a return spring connected to said handle.

7. A projector according to claim 6, wherein said means for mounting said channel-shaped member include a leaf spring having a pair of spaced fingers engaging the wall of said member in which said opening is formed.

8. In a projector of the class described, the combination of a guideway for a strip of film having an opening through which a beam of light is adapted to be projected and having a recess at the sides of said opening, a pair of transparent plates between which the film is adapted to pass having their outer edges positioned in said recess, a flat member between said plates at the sides of said opening having a thickness slightly greater than the thickness of the film strip to space said plates apart just sufficiently to enable the film strip to be moved freely therebetween, and means including flat springs mounted in said recess and engaging at least one of said plates adjacent opposite side edges thereof for maintaining said plates against said flat member.

9. In a projector of the class described, the combination of a pair of superimposed detachably secured members providing guideway means for a strip of film each having aligned openings through which a beam of light is adapted to be projected and each having a recess surrounding its opening, a pair of laterally spaced relatively thin strips positioned between said members to space the members apart and being spaced to provide a film strip passageway aligned with the openings of said members, a transparent plate at each side of said pair of strips the outer edges of which are positioned in said recess, and springs in said recess for urging said plates against said strips, said strips having a thickness slightly greater than the thickness of the film strip to space said plates apart just sufficiently to enable the film strip to be moved freely therebetween.

LESTER RAYMOND BANGSBERGH.

References Cited in the file of this patent

UNITED STATES PATENTS

| Number | Name | Date |
| --- | --- | --- |
| 1,284,598 | Coberly | Nov. 12, 1918 |
| 1,342,560 | Mengel | June 8, 1920 |
| 2,146,237 | Stephens | Feb. 7, 1939 |
| 2,168,987 | Hopkins | Aug. 8, 1939 |
| 2,368,779 | Pyles | Feb. 6, 1945 |
| 2,534,732 | Perillo | Dec. 19, 1950 |
| 2,550,799 | Fuller | May 1, 1951 |